United States Patent [19]

Billington et al.

[11] 4,230,161
[45] Oct. 28, 1980

[54] THERMAL MANUAL EMERGENCY SHUT OFF VALVE

[75] Inventors: Evans R. Billington, Glenview; Robert J. Batka; Christ P. Korbilas, both of Chicago, all of Ill.

[73] Assignee: Rego Company, Chicago, Ill.

[21] Appl. No.: 951,165

[22] Filed: Oct. 13, 1978

[51] Int. Cl.³ ................................................. B65B 3/26
[52] U.S. Cl. ..................................... 141/302; 141/192; 141/388; 251/294
[58] Field of Search ........................... 141/37–65, 141/285, 198–229, 386, 387, 388, 382, 279, 192, 301, 302; 251/74, 89, 66, 67, 111, 113, 294; 137/75, 572

[56] References Cited

U.S. PATENT DOCUMENTS

| 1,801,750 | 4/1931 | McEachern | 251/74 |
| 2,700,487 | 1/1955 | Thoresen et al. | 251/74 |
| 2,884,024 | 4/1959 | Larkin et al. | 141/218 |
| 2,889,688 | 6/1959 | Jones et al. | 141/218 |
| 3,165,236 | 1/1965 | Beazer et al. | 251/74 |
| 3,260,554 | 7/1966 | Heiland | 251/74 |

Primary Examiner—Houston S. Bell, Jr.
Attorney, Agent, or Firm—Sixbey, Friedman & Leedom

[57] ABSTRACT

Multi position flow check valves for both liquid and vapor filler conduits having essentially two positions, a closed position, and a wide open flow position to activate the latch, the valve being automatically closed from the flow position under hazardous conditions including equipment accidents and fires, and open only when manually opened for latching purpose in tank filling operations at bulk storage stations. One hazardous condition includes an appreciable stretch strain exerted on filler hoses connected between the storage supply tank and the mobile delivery tank sufficient when dangerous to close the valves and prevent serious escape of gases in event of hose rupture. Non-extendible elements providing the differential criteria also serve as remote shut-off controls, including manual, automatic and thermal for safety termination of a refilling operation.

9 Claims, 7 Drawing Figures

THERMAL MANUAL EMERGENCY SHUT OFF VALVE

BACKGROUND OF THE INVENTION

In the sale and distribution of liquefied petroleum fuel gas (L.P. Gas) to individual customers it is conventional for a distributor to use stationary, above ground bulk storage tanks, as large as sixty thousand gallons, to store the highly volatile and inflammable liquid under substantial vapor gauge pressure and then distribute it to customers by delivery truck tanks that are filled repeatedly from the storage tanks under said vapor pressure through detachable liquid supply and vapor return conduits which include flexible hoses detachably connected to the truck delivery tank. These conduits are permanently connected to the bulk storage tanks and have automatic cut off flow control valves at the outlets to the hoses and shut off valves at the free ends of the hoses connectible to truck tanks which in turn have back check valves.

It is desirable that the conduits include quite flexible hoses to accommodate a random and quick positioning of a tank truck for rapid connection thereto and filling. Preferably the transfer hoses are short, approximately ten feet long (3 meters), and are one and one half inch or larger in diameter for strength and ease of handling, and also for rapid filling while, for safety, minimizing the volume of liquefied gas present at any given time in the hoses between the tanks. The liquefied gas is forced by the liquefied gas pressures or by pumps through the liquid hose at a high rate of flow to minimize tank filling time and maximize customer deliveries.

Aside from maintaining the handling and filling equipment in acceptably safe condition, an ever present random danger conventionally exists in which, for any one of several reasons, a delivery truck driver receiving L.P. Gas will occasionally drive his replenished truck away while the hoses are still connected between the truck tank and storage tank. This ruptures the hoses under substantial tension and gas pressure forces, and generally after such a hose rupture, there is substantial pressurized spillage of liquefied gas that rapidly creates a highly dangerous fire hazard regardless of the automatic closing of safety flow-check valves after a break. Substantial amounts of vaporizing gas escape before conventionally arranged valves are effective. Automatic outflow cut-off transfer valves have been used such as described and claimed in Application Ser. No. 708,128, now Billington et al, U.S. Pat. No. 4,099,551, where a trip cut-off cord is connected to the truck which trips a valve by unlatching a dog that supports a spring for closing check valve in the outflow to the hose. Many times it has been found that the cord is not attached to the truck during filling operations.

In the present invention, the valves are closed before a rupture occurs in either hose and at most any escaping gas would be only that in the filler hose. The check valve in the invention closes in the direction of outflow. It also has means to close the valve if a fire may already have been started from sparks or any one of several other reasons, thereby confining spillage to the short hose contents which if ignited would quickly burn out with minimal escape of gas with a fuse metal release also assuring automatic closing of a dispensing outlet valve. These are improved safety steps.

One of the objects of the invention is to compel the followance of the proper sequence of the truck tank filling procedure in a way which automatically prevents any hazardous spillage if there is inadvertent drive away without disconnection and prevents any further use without attention and repair.

Another object of the invention is to control and limit any escape of hazardous material to only a readily dispersible known amount and confine any damage to equipment that is easily restored or replaced.

Another object is to assure good inspection, testing and upkeep of frangible safeguards provided for the ultimate prevention of dangerous break-away spillage and fires.

A further object includes safeguarding truck filling equipment against damage of any parts other than a quickly replaceable preassembled hose unit rigidly supported against movement at its storage tank end.

Other and further objects include the inhibition of liquid transfer except by personnel present if automatic equipment might be defective or improperly handled.

Moreover, the safety cut off control can serve as an additional manual shut off control when the delivery tank is filled to its proper level. Thereupon, with the shut off accomplished the setting of all controls and connections can be finalized for disconnecting the truck tank safely from the storage supply tank.

These being among the objects of the invention, other and further objects will appear in the drawings and description that follows.

SUMMARY OF THE INVENTION

The transfer of liquefied petroleum gas from a bulk storage tank to a truck delivery tank is made through stretchable flexible hoses secured to the storage tank supply conduits at one end and carrying at the other ends non-extendible cables secured to the detachable (truck) ends of the hoses with the free moving ends of the cables connected to automatic shut off vapor and liquid flow control valves that are rigidly supported with respect to said free moving ends of the hoses and which are attached permanently to the liquid and vapor conduits of the bulk storage tank. The cables are supported on the hoses with their axes substantially parallel whereby the valves are closed by tension displacement of the cables when the hoses are physically stretched by premature truck movement to an extent almost to the rupture point of at least one of the hoses. Special flow cut-off valves are activated by the cables as described herein to confine any escape of gas to the atmosphere to the residual amount of gas in the hose or hoses.

IN THE DRAWINGS

FIG. 1 is a schematic perspective view of a plant loading station employing a Swing Check Emergency shut off valve 44 for the transfer of liquid and excess flow emergency shut off valve 46 for the vapor, both having means for manually opening and closing the valves and additional means for closing by trip cables 34 or 36 attached to the transfer hoses, a secondary remote closure by means of cable 76 and 76A and thru thermal means of fuse release integral with the valves incorporated at 74 or 36.

DESCRIPTION OF THE INVENTION

Figure 1:
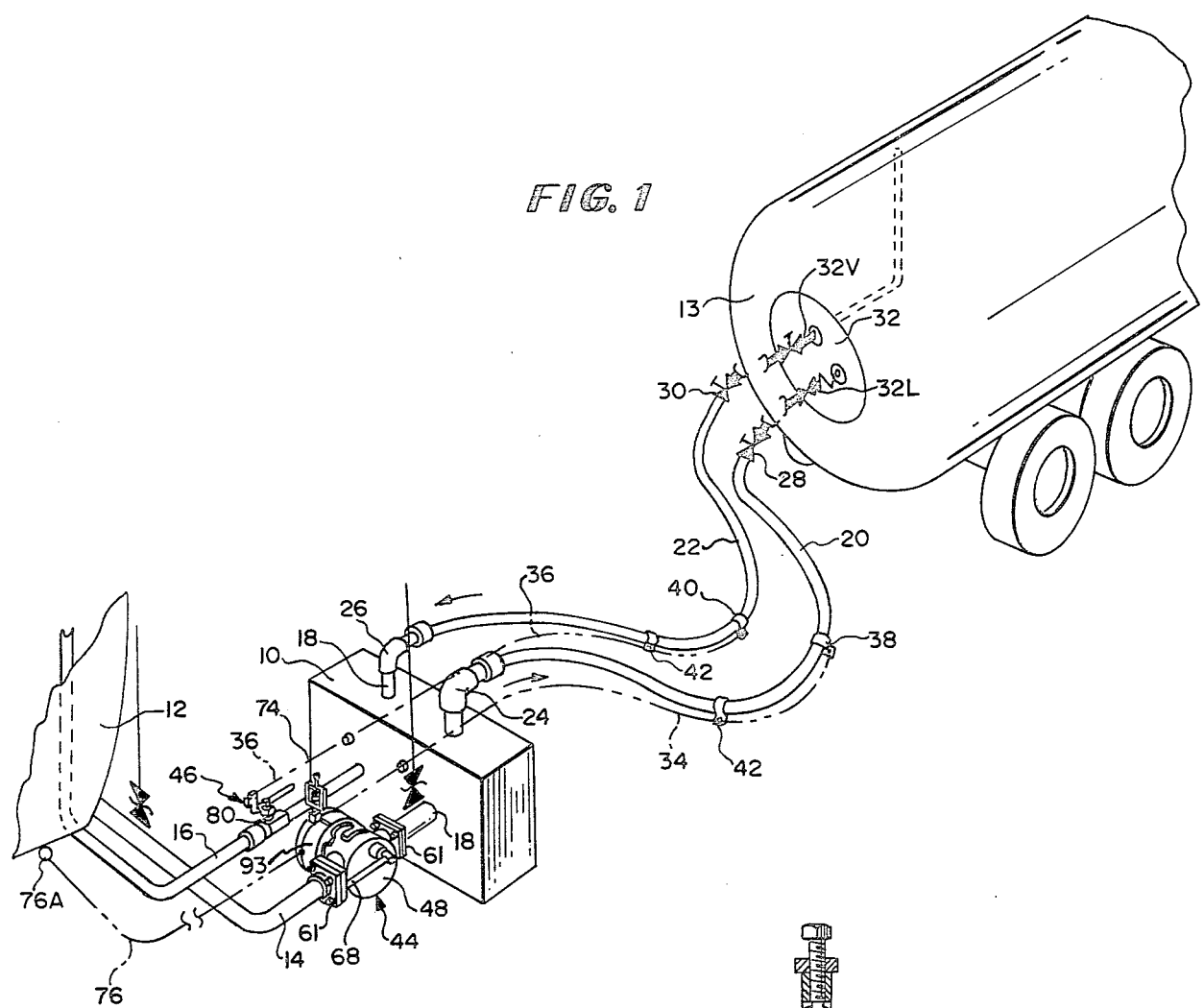

An L.P. Gas bulk storage and truck tank loading station is illustrated in FIG. 1 preferably provided with a cement bulkhead 10 serving in part as a protection to prevent piping pull out or distortion if the truck should pull away with the hoses still connected and also for separating the truck filling area from the storage area to protect the bulk storage tank 12 premises against physical damage from mobile equipment. The dispensing system for the tank includes a liquid supply conduit 14 from the tank 12 and a vapor return conduit 16 to the tank. These elements preferably are made of rigid material and extend through and slightly beyond and are firmly embedded as at 18 in the cement of the bulkhead 10 so that they are anchored to the earth to obviate any strains upon the rigid piping 14 and 16 with respect to the storage tank 12. They extend a short distance beyond the bulkhead to provide rigid hose attachment extensions 24 and 26, respectively.

The protective equipment on the storage tank side of the bulkhead 10, not only includes novel controls and valves, themselves embodying invention, in the conduits 14 and 16, but also flow control dispensing and safety valves (not illustrated) that are required by Government Regulations at the conduit connections 14 and 16 to the bulk storage tank 12.

On the truck tank 13 side of the bulkhead 10, the conduit system includes flexible hoses 20 and 22 secured to the rigid extensions 24 and 26, for liquid filling and vapor return, and, at their free ends the hoses carry shut off valves 28 and 30 which in turn are connectible to the truck filler valve system 32 which includes a manual shut-off vapor valve 32V with a fuse link and an automatic emergency liquid back flow cut off valve 32L, conventionally required as safety equipment to protect against escape of fuel if the hoses become defective or are inadvertently disconnected. The hoses serve as flexible extensions of the conventional rigid liquid supply conduit 24 and pressure equalizing vapor return conduit 26 for fast filling operations, with or without a flow booster (not shown) in the liquid conduit 14 leading from the storage tank, and, supported in parallel relationship therewith, are safety shut-off, non-extendible cables means 34 and 36, respectively, secured at one end 38 and 40 to the hoses 20 and 22, respectively, adjacent to the truck valve end and movable a substantial distance at the other end with respect to the hose. Thereby, when a hose is stretched, a cable is tightened to actuate a cut-off of the replenishing supply of L.P. Gas through the hose. The stretching performs work to shut off flow in either hose before a hose connection can be or is ruptured by any additional stretching and bursts while carrying a gauge pressure under conditions which might present a fire hazard. This anticipation and this securement possibility greatly reduces extensive dangers conventionally present in the field.

Although many hose materials or know tubular reinforcement weave patterns can be used for the flexible filler and vapor return hoses 20 and 22 for quick connection and transfer of liquefied petroleum gas from the bulk storage tank 12 to a mobile truck delivery tank 13, it is preferred for the invention, to provide an appreciable extendibility before damaging the hose to provide a variable hose elongation under varying tensions with the slow truck start up that may perform work while conditions are still safe for property and personnel. Thereby, not only does the invention provide a quick and easy hook-up between non-aligned pipe fittings and also tends to stiffen and straighten the hoses under applied internal pressures, when free to do so, but may elongate stretchably a substantial distance before tearing, such capability as a mechanical operation, serving many purposes related to safety and prevention of waste.

The flexible conduits 20 and 22 do not lengthen appreciably under internal pressure, but preferably have a stretchable weave reinforcing a tubular elastomeric member that tends to straighten under internal pressure and yet stretch to an appreciable extent under a varying longitudinal stretch tension externally imposed upon them. Either one, or preferably both hoses, carry non-extendible safety control cables 34 and 36 that are paired with and terminally secured to the hoses 20 and 22 adjacent their free ends as indicated by clamps 38 and 40, respectively. Although the cables may be paired with each pair is shown disposed in externally parallel relationship and have eyelets 42 carried by the hoses over their respective overlapping lengths to provide relative free parallel movement between the members of each pair.

The free ends of the cables 34 and 36 extend freely through the bulkhead 10 for connection to the respective flow control valves 44 and 46 in the liquid flow and vapor return hoses 20 and 22, respectively. Preferably the centers of the respective pairs of conduit and cable openings through the barrier 10 are spaced vertically with respect to each other so that horizontal movement of the attached truck ends of the hose and cable will not appreciably vary their relative working lengths with respect to controls supported on the bulkhead 10.

Thereby, if either or both of the hoses are stretched by any truck pull-away movement, as when the hoses 20 and 22 stretch and move with respect to their respective cables 34 and 36 to pull the cables when the hoses are placed under stretch strain approaching that which might otherwise be sufficient to cause the hose to tear and burst or not work at all, the free ends of the cables are displaced substantially and will actuate and trigger the release of the respective flow check valves 44 or 46, to permit them to be moved to their closed position, by spring or by initial pressure liquid flow through them.

Thus, being carried by the hoses themselves the flexible cables are always present and used automatically when needed for safety sake. They are also easy to inspect and keep in good repair for actuating one or more reliable safety-closures of storage tank flow cut off valves before a hose rupture occurs if there is such a danger developing. The presence of this stretch characteristic in the hose itself assures not only its constant presence safety wise, but also an optimum relation in which the adjustment of such a cable means will enable any degree of shut off stretching desired before the hoses are torn open by a truck pull away. Such can be provided and be adjusted any time at the filling site. Also if the hose is not kept in top condition it will only operate just that much faster.

A stretchable hose 20 or 22, being the element carrying the safety cut off control cable 34, or 36 respectively, not only will be present always, and, be maintained in good condition at the bulk storage site, but the safety cable is always armed continuously for effectiveness under many contingencies related to storage tank outlet valves being left open and only the shut off valves 28 and 30 being operated in a succession of service tank filling uses. Then, it is of ultimate importance that even if the hose, in stretching, is ultimately ruptured, the danger of fire and loss of liquefied gas is greatly reduced and limited to the fluid volumes of the hoses themselves which with these guards preferably need be only 10 feet (3 meters) in length or less if desired. In case the hoses are quite long, back flow check valves are used to limit the volume subject to escape through a rupture.

Upon disconnection the dispensing flow is stopped from the storage tank by the shut off valves 28 and 30 while conventional back flow check valves on the truck tank protect against any truck tank outflow loss.

LIQUID FLOW CONTROL VALVE

Referring now to the manually opened liquid flow control valve 44, (before considering the vapor control valve 46 in further detail), a flapper check valve assembly 64 is non-rotatively mounted on a pivotal shaft 52 journalled at 54 and sealed at 56 at both ends in a valve housing 58 that is connected in the liquid service conduit 14, with its inlet indicated at 60 and outlet at 62 (FIG. 4) threaded or supported by unions 61 (FIG. 1). The shaft 52 carries a flapper check valve assembly 64 on the shaft to close in the direction of dispensing flow of liquefied petroleum gas liquid in the service conduit 14. One end of the shaft receives a handle 68 for manual opening and the other end receives a torque spring 66 urging closure and a lug or a trip arm 70 (FIG. 2) cams the latch 71 outwardly in order to be engaged by the latch 71 which is urged into latching engagement by a spring 72. This mechanism is protected by a removable cover 93 (FIG. 3). Over throw of the arm 70 by the handle 68 when manually advanced permits the latch 71 engagement therewith for unattended liquid flow through the valve. A hardened replaceable striker plate 73 is provided at the critical point of wear.

Figure 2:
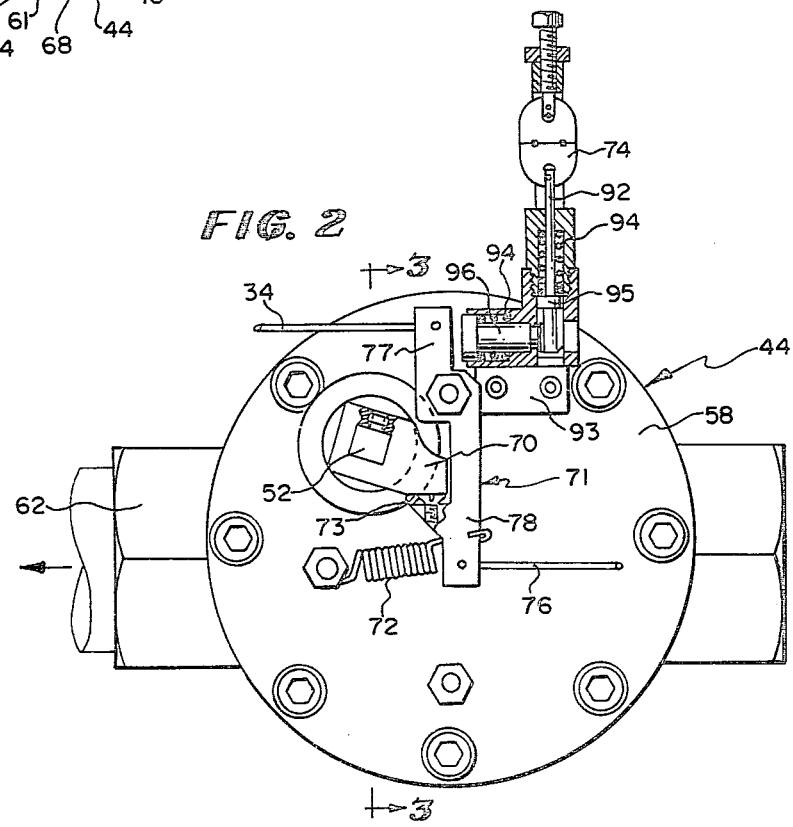
FIG. 2 is an enlarged side elevation of the swing check valve controls.
Figure 3:
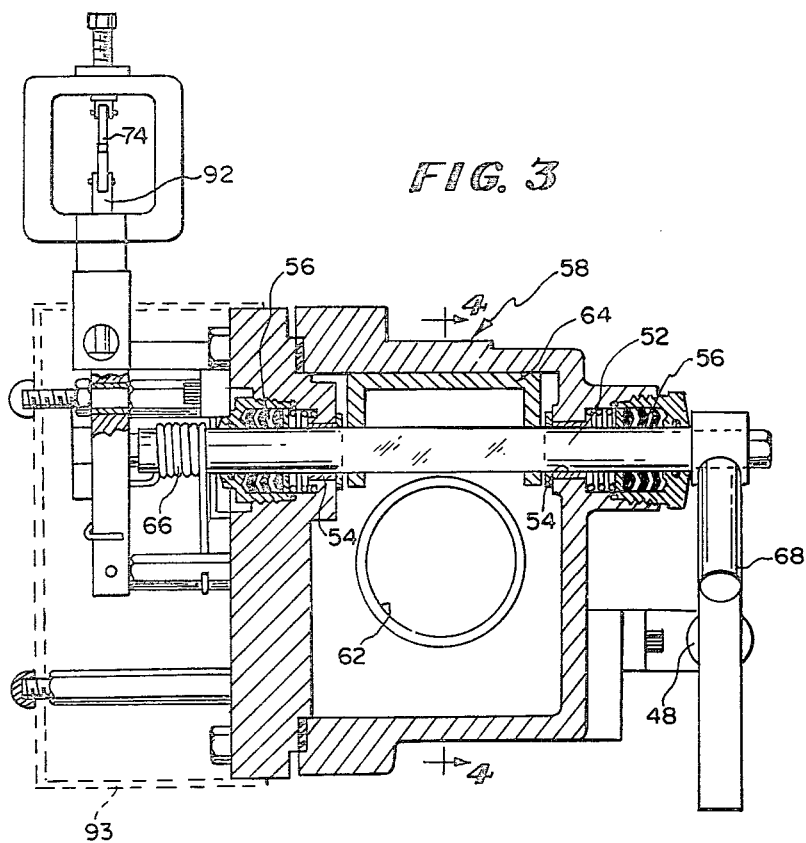
FIG. 3 is a sectional view taken on line 3—3, in FIG. 2.

In the present invention during a tank filling operation, the valve 64 is manually opened by the handle 68 on one end of the shaft, and the overthrow of the arm 70 by the handle permits engagement by the latch 71 to hold the valve 64 in its full flow position for filling the delivery truck tank 13 (FIG. 2).

The latch is urged by the spring 72 to maintain engagement but is released to permit valve closure in event of:

(a) a truck breakaway while the hoses 20 and 22, or both, are still connected to the tank 13;

(b) the melting of a fuse metal link 74 released by the presence of any fire; or (c) the actuation by personnel of any one of several manual site controls 34 and 76 that are available for any one of a number of safety reasons to actuate the latch 71. Releasing the latch 71 permits rotation of the shaft 52 to close the valve 64 under the effort of the torque spring 66 and the force of flowing liquid passing through the valve thereby shuts off the flow of liquid beyond the barrier.

The latch 71 is pivotally mounted on the housing intermediate its ends to provide actuatable arms 77 and 78 that receive the working ends of the independently actuated cables 34 and 76 which when actuated move the latch 71 to release the valve 64 for it to close.

The one cable 76 may be operated manually while the cable 34 may be operated automatically by the stretch effect of the liquid hose 20 upon the cable 34 as noted.

Under certain emergency conditions of closure, the closing velocity of the valve 64 is rapid and of such force that twisting distorsion of the shaft 52 could occur. To alleviate this, the handle 68 is cushioned by a resilient bumper 48 to absorb the inertial energy of the valve 64 and handle. The arm 77 also is actuated by a heat meltable fuse such as 74, located wherever there is a critical danger of fire remote from the valve. Preferably, the heat meltable fuse 74 is mounted on a bracket 93 secured to the valve housing 58 where a spring held stem 92 is restrained by the intactness of the fuse 74 from releasing a latch rod 96 at its lower end which driven by a spring 94 to strike the upper arm 77 of the latch 71 and thereby release the latch 71, and hold it released for the flapper check valve assembly 64 to close until the fuse member 74 is replaced. A cover 93 protects this assembly from willful tampering and dirt and a flange 95 on the piston 96 obstructs the return of the piston 96.

Whenever released, the arm 68 on the valve shaft 52 is permitted to be turned by the valve shaft 52 to permit the flapper check valve assembly 64 to close as an outflow check valve to protect the storage tank 12, and, no amount of manipulation of the handle thereafter will permit unattended liquid outflow from the storage tank 12 until the fuse 74 is replaced and the piston 96 reset. This out-flow check valve characteristic will prevail while the conventional excess outflow check valve of the truck tank will prevent flow therefrom if the liquid hose is also ruptured or disconnected.

Figure 4:
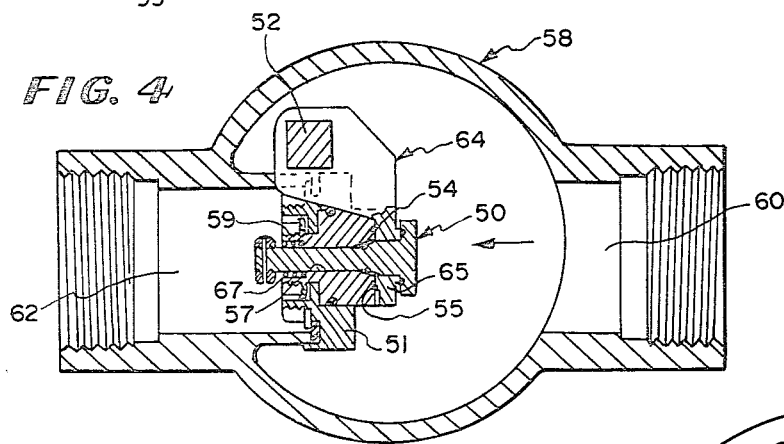
FIG. 4 is a sectional view taken on line 4—4, in FIG. 3.
Figure 5:
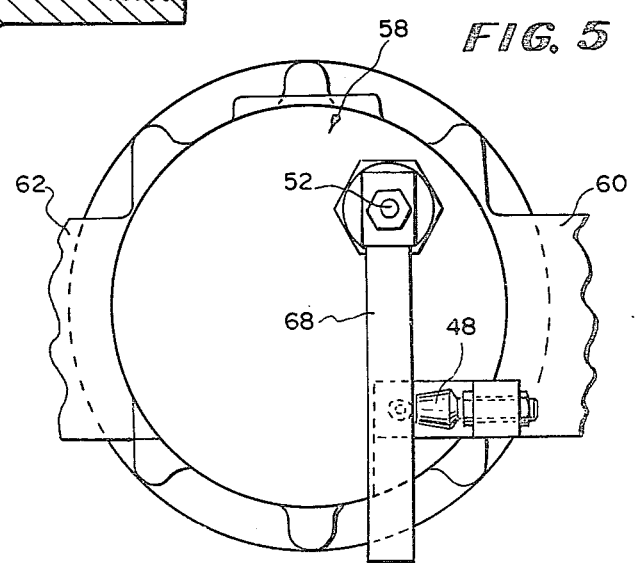
FIG. 5 is a side elevation of the manual control shown in FIG. 4.

Since L.P. Gas working pressures can vary from 10 p.s.i.g. to 200 p.s.i.g., depending upon temperatures, the force at higher pressures to open the flapper check valve assembly 64 may be too great to be practical if the pressure were effective over the full flow area of its closing seat disc 51. In order to have a reasonable opening force effect, a pilot piston 50 sealed with "O" rings 54 and 55 is incorporated in the valve 64 (FIG. 4). These being of smaller area, permit the use of lesser valve opening forces, over the area of an annular passage 57 between the piston 50 and the hole 59 through the disc 51, thereby, with little effort, quickly equalizing the pressure on both sides of the large seat disc 51, without affecting tank excess flow check valves and, once equalized, the opening of the valve 64 requires only the force necessary to overcome the torsion spring 66 and the weight of the flapper check valve assembly 50. The equalization takes place past the loosely fitting pilot piston 50, and its O-ring 54, past the axial O-ring 55 as the pilot piston is displaced outwardly by the valve carrier bracket 65, a light compression spring 67 maintaining parts alignment for ease of closing.

VAPOR FLOW CONTROL VALVE

The vapor control valve 46 is a versatile valve serving at either or both ends of the vapor pressure equalizing conduit 16 that interconnects the vapor spaces of the storage tank 12 and the delivery truck tank 13.

(1) They provide a pressure equalizing flow of vapor under pressure in either direction between the two tanks but primarily for optimum flow of vapor volume to the bulk storage tank equal to the liquid volume replaced, (2) Each separately serves manually and automatically under surge as an excess vapor flow check valve under predetermined initial gauge pressure differentials, yet automatically equalizes pressures and reopens for liquid gravity flow, (3) With equal facility and safety, each serves equally well at the vapor outlet opening of each tank as vapor excess flow check valves for both tanks should the flexible vapor conduit 22 portion of conduit 16 be ruptured, (4) Each operates as an emergency shut off valve in event of fire, (5) Each valve may be hand closed when not in use, and, (6) The displaced volume flow of the pressurized vapor is practically the same as the volume flow of the replacing liquid, any differential effect being related to the relative fluidity of vapor and liquid at tank temperatures.

Figure 7:
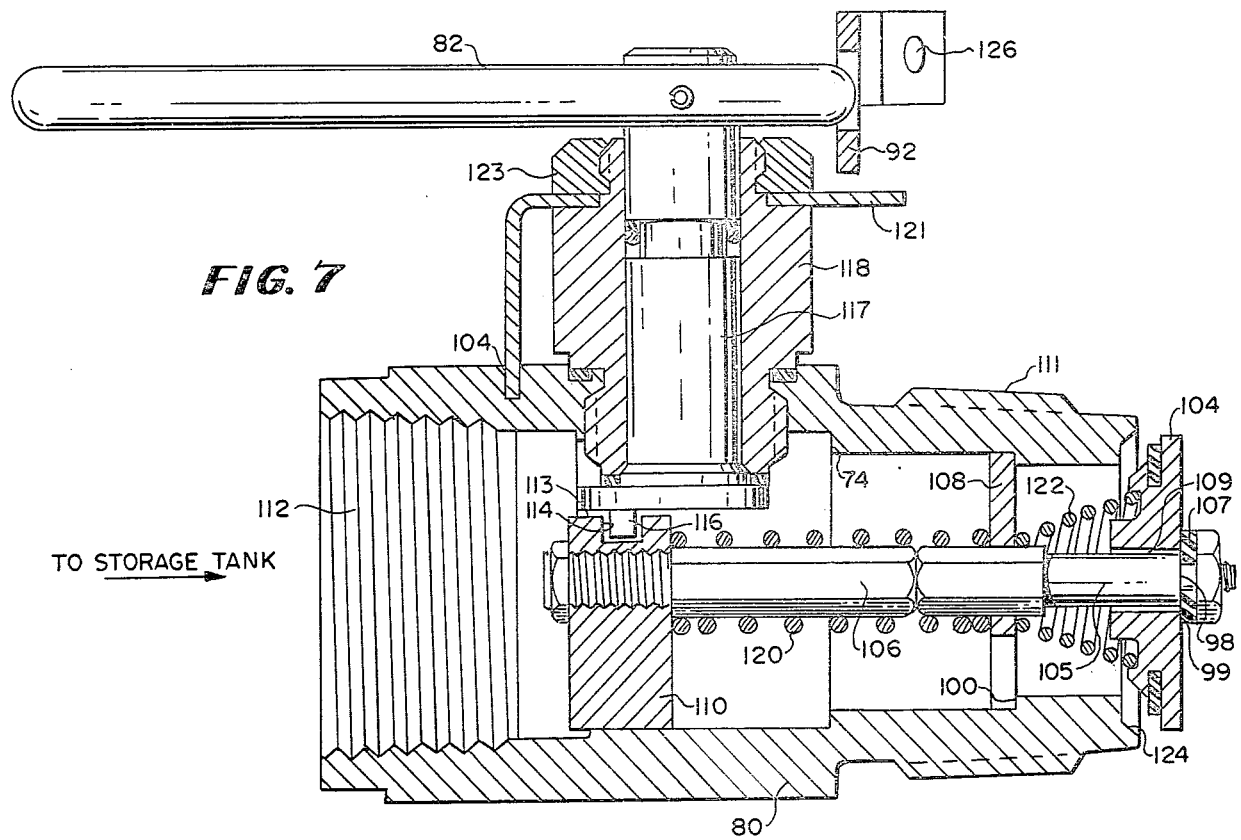
FIG. 7 is an enlarged sectional view of the manual control valve illustrated in FIG. 6.

As more particularly illustrated and claimed in the co-pending application of Larry F. Odar for a vapor flow check valve, the body 80 (FIG. 6) shown herein is externally threaded with a male thread 111 (FIG. 7) at its upstream end and its valve seat 124 is disposed terminally at the end of the thread 111, facing towards the interior of the respective tank which it protects. The valve element 104 and the critical actuating elements can then be disposed within the threaded portion for their protective location within the confines of the tank against physical damage if the valve body is damaged or is broken from its mounting. At the other end, the body is internally threaded to receive the vapor conduit 22 between the tanks. The valve opens to permit flow through the body 80 into the tank, but controls vapor flow from the tank to equalize vapor pressures between the tanks 12 and 13 through the conduit 14 during liquid transfer. The valve when free of this operation is normally closed for the connection and disconnection of the hose 22. Its working position is normally hand set at its excess flow control position to better equalize the vapor pressures of the two tanks in assisting flow control of liquid in a liquid conduit between them.

For these purposes, the valve member 104 is slidably mounted on the cylindrical end 105 of a centrally located reciprocable valve stem 106 which terminally is of reduced diameter to provide an appreciable clearance at 109 between them. This clearance is open when the valve 104 closes under excess flow conditions. Otherwise, the clearance 109 is closed by the resilient stop washer 107 serving as a valve supported by a nut 98 threaded to the stem 106 as positioned by a shoulder 99. When free to do so, the stop washer 107 is held closed by the excess flow spring 122.

The valve stem 106 supporting the valve member 104 is slidably mounted for reciprocation through a foaminated stem guide 108 that is held at the valve end against a fixed stop or shoulder 100 in the valve housing by a compression spring 120.

At its other end, the stem 106 rigidly carries a yoke 110 having a chordal flat 113 on its periphery that is grooved lengthwise thereof at 114 to serve as a follower and receives slidably therein a cam or crank pin 116 on the lower end of a manually rotated shaft 117 journalled in the body bushing 118 whose axis is disposed at a right angle to the flat 113 and slot 114.

Figure 6:
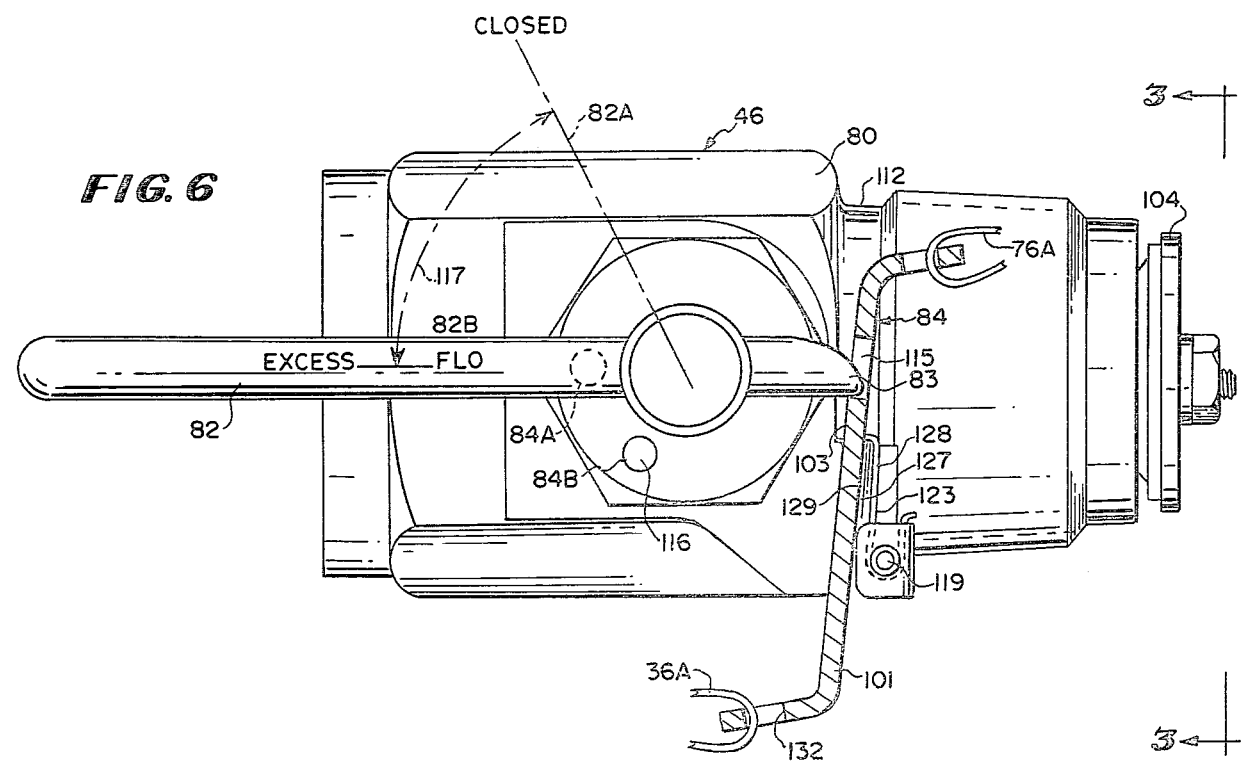
FIG. 6 is a perspective view partly in section showing a combined manual and automatic shut off control.

The dimensions are such, preferably, as illustrated in FIG. 6, that partial rotation by the handle 82 of the crank pin 116 from its "closed" position at 84A through 60 degrees with respect to the slot 114 cams the stem 106 and controls the movement of the valve 104 between its "closed" position 82A, to its open position at 82B. Thus, approximately 60° rotation of the shaft provides an arcuate movement of the pin 116 that manually advances the stem 106 to open the valve to its excess flow position that is shown in full lines with the handle 82 at 82B in a longitudinal alignment normally associated with flow control valves. From this position the pin 116 is located at 84B laterally of the stem 106. The reverse movement of the pin 116 under the effort of the compressed spring 120 cranks the pin 116 to drive the valve to its closed position when free from restraint to do so.

However, referring to FIG. 6, the handle 82 is shown latched to a double ended lever latch 84 which releasably receives and holds the handle in its excess flow valve operative position 82B when moved thereto from its closed valve position 82A. This sector of movement of the pin 116 by the handle 82 movement indicated is rotationally oriented to transverse in the arc 117 indicated.

The latch arrangement for arm 82 is supported on a bracket 121 which is L-shaped to support a pin 119 upon which is pivotally supported a bracket 123 that has an arm 127 urged by a torsion spring 128 to move counter clockwise, as view in FIG. 6. The latch 84 is joined to the arm 127 by means of an eutectic alloy 129 having a melting point between 212°–250° F. (100°–125° C.).

The latch member 84 is in the form of a cross arm 101 with a camming surface 103 which ends in a critically located opening 115 intermediate its ends that receives the tapered end 83 of the handle 82 in latched relation in the excess flow valve open 82B position. The ends of the cross arm 101 have openings 126 and 132 which receive the ends of one or more manual pull cables comparable to cables 36 and 76 indicated at 36A and 76A.

In operation, when heat from a fire loosens the alloy 129 and frees the cross arm 101, or the ends at either of the openings 126 and 132 respectively of the cross arm have been moved by the cables, the latching of the handle is released. Once released, the valve 104 and handle 82 are moved to their "closed" positions under the effort of the compression spring 120 to function as a vapor flow cut off valve to protect against flow of vapor from the respective tank involved, such as the storage tank 12. The valve 104 can still be operated by hand in an emergency but only with constant manual attention. Restoring the valve 104 to an excess flow position would follow after repair and supervisor's check up is made of the system.

What is claimed is:

1. A fluid transfer system for directing the transfer of fluid between a stationary fluid supply tank and a mobile fluid delivery tank and for stopping the transfer of fluid between the stationary fluid supply tank and the mobile fluid delivery tank in response to a predetermined emergency condition, said fluid transfer system comprising:

(a) a rigid fluid transfer conduit connected to the stationary fluid supply tank;

(b) a flexible fluid transfer conduit formed from elastic material and serially connected between said rigid fluid transfer conduit and the mobile fluid delivery tank;

(c) flow check valve means mounted in said rigid fluid transfer conduit to close off the flow of fluid therethrough;

(d) resilient means for urging said flow check valve means to a closed position;

(e) manual means for opening said flow check valve means to a full-open position;

(f) latch means for releasably holding said flow check valve means in said full-open position; and (g) emergency trip means for actuating said latch means to close said flow check valve means whenever said flexible fluid transfer conduit is stretched beyond a predetermined limit, said emergency trip means including a non-elastic elongated element having a first end connected to said latch means and a second end fixedly secured to a remote point on said flexible fluid transfer conduit such that said latch means is released by said non-elastic elongated element to close said flow check valve means whenever the distance between said latch means and said remote point is increased beyond a predetermined amount as a result of the stretching of said flexible fluid transfer conduit beyond said predetermined limit.

2. The fluid transfer system defined in claim 1 including a heat meltable fuse alloy means for releasing said latch means from its latching position.

3. The fluid transfer system defined in claim 2 including a spring driven element, said meltable fuse metal means releasing the spring driven element to release said latch means.

4. The fluid transfer system defined in claim 1 including a lanyard means connected to said latch means for closing the valve by a distant access control.

5. A fluid transfer system as defined in claim 1, wherein said flow check valve means includes a valve seat, a valve element which contacts said valve seat to close off the flow of fluid through said rigid fluid transfer conduit, and a pilot piston means mounted within said valve element, said pilot piston means operating to reduce the force necessary to overcome upstream fluid pressure while moving said valve element out of contact with said valve seat.

6. A fluid transfer system as set forth in claim 1, wherein the stationary fluid supply tank contains liquified petroleum gas which is transferred between the stationary fluid supply tank and the mobile fluid delivery tank via said rigid fluid transfer conduit and said flexible fluid transfer conduit.

7. A fluid transfer system as set forth in claim 6, including a vapor return conduit means interconnecting the stationary fluid supply tank and the vapor space in the mobile fluid delivery tank.

8. A fluid transfer system as set forth in claim 7, wherein said vapor return conduit means includes a flexible vapor return conduit section formed from elastic material, a vapor back flow check valve mounted on said vapor return conduit means to control the flow of vapor therethrough, a latch means for operating said vapor back flow check valve, and a second non-elastic elongated element having a first end connected to said vapor back flow check valve latch means and a second end fixedly secured to a remote point on said flexible vapor return conduit section such that said vapor back flow check valve latch means is actuated by said second non-elastic elongated element to close said vapor back flow check valve whenever the distance between said vapor back flow check valve latch means and said remote point on said flexible vapor return conduit section is increased beyond a predetermined amount as a result of the stretching of said flexible vapor return conduit section beyond a predetermined limit.

9. In a fluid transfer system including a stationary fluid supply tank and a mobile fluid delivery tank for receiving fluid from the stationary fluid supply tank, a fluid flow control means for directing the transfer of fluid between the stationary fluid supply tank and the mobile fluid delivery tank and for stopping the transfer of fluid between the stationary fluid supply tank and the mobile fluid delivery tank in response to a predetermined emergency condition, said fluid flow control means including:

(a) a fluid transfer conduit means for conducting a flow of fluid between the stationary fluid supply tank and the mobile fluid delivery tank, said fluid transfer conduit means having at least one section thereof formed from flexible elastic material;

(b) flow check valve means mounted on said fluid transfer conduit means to close off the flow of fluid therethrough;

(c) resilient means for urging said flow check valve means to a closed position;

(d) manual means for opening said flow check valve means to a full-flow open position;

(e) latch means for releasably holding said flow check valve means in said full-flow open position; and (f) emergency trip means for actuating said latch means to close said flow check valve means whenever said flexible section of said fluid transfer conduit means is stretched beyond a predetermined limit, said emergency trip means including a non-elastic elongated element having a first end connected to said latch means and a second end fixedly secured to a remote point on said flexible section of said fluid transfer conduit means such that said latch means is released to close said flow check valve means whenever the distance between said latch means and said remote point is increased beyond a predetermined amount as a result of the stretching of said flexible portion of said fluid transfer conduit means beyond said predetermined limit.

* * * * *